Figure 1:
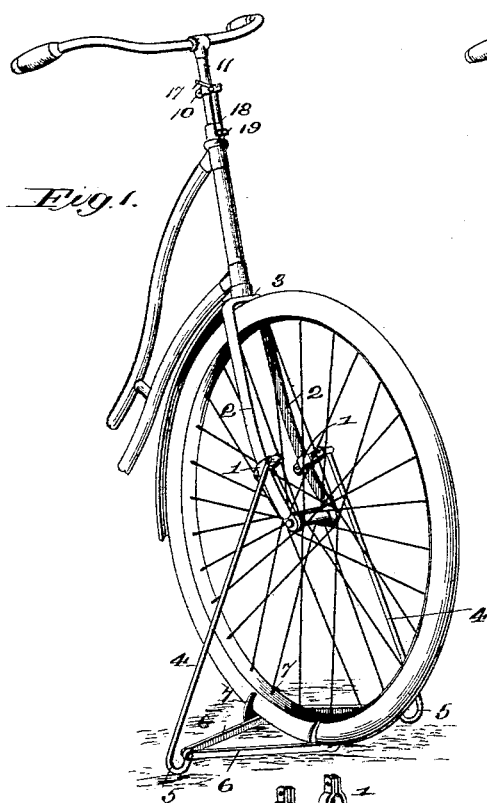

No. 620,714. Patented Mar. 7, 1899.
C. MEE, Sr.
BICYCLE HOLDER.
(Application filed Jan. 25, 1897.)

(No Model.)

Witnesses
Jos. C. Stack.
Victor J. Evans.

Inventor
Charles Mee, Sr.
By John Wedderburn.
Attorney

UNITED STATES PATENT OFFICE.

CHARLES MEE, SR., OF ROCHESTER, NEW YORK.

BICYCLE-HOLDER.

SPECIFICATION forming part of Letters Patent No. 620,714, dated March 7, 1899.

Application filed January 25, 1897. Serial No. 620,607. (No model.)

*To all whom it may concern:*

Be it known that I, CHARLES MEE, Sr., a citizen of the United States, residing at Rochester, in the county of Monroe and State of New York, have invented certain new and useful Improvements in Bicycle-Holders; and I do hereby declare the following to be a full, clear, and exact description of the invention, such as will enable others skilled in the art to which it appertains to make and use the same.

This invention relates to bicycle-rests, and is in the form of an improvement upon the construction shown and described in Letters Patent No. 535,594, granted to me March 12, 1895.

It is the object of the present invention to accomplish the same desirable ends resulting from the construction illustrated in the patent referred to in a much simpler and more economical manner, so as to make the rest more marketable and enable the same to be sold at a price within the means of every one.

In the construction hereinafter described the locking device, which formed a separate attachment from the rest proper, is dispensed with and the rest itself is constructed in such manner as to constitute a lock for engaging the rim or tire of the wheel, and while upholding the machine in an erect position will at the same time prevent the bicycle from being surreptitiously ridden or carried off.

To this end the invention consists in a combined rest and lock for bicycles embodying certain novel features and details of construction and arrangement of parts, as hereinafter fully described, illustrated in the drawings, and incorporated in the claims.

Figure 2:
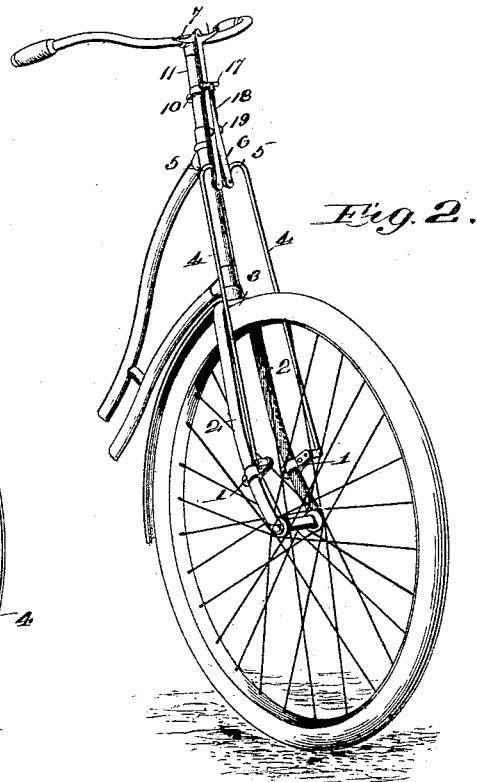
Figure 3:
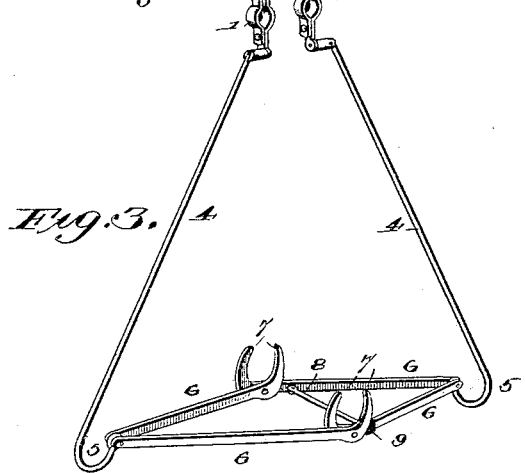
Figure 4:
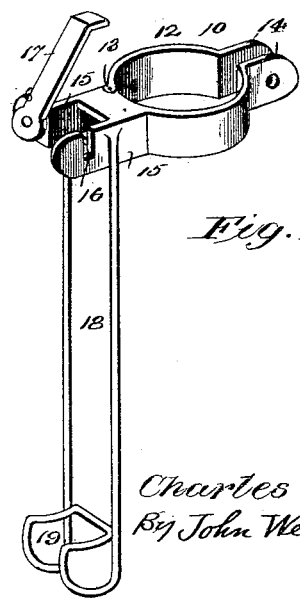

In the accompanying drawings, Figure 1 is a perspective view showing the front portion of a bicycle and also showing the improved rest and lock attached thereto and in its operative position. Fig. 2 is a similar view showing the device in its folded and inoperative position. Fig. 3 is a detached perspective view of the combined rest and lock complete and ready for application. Fig. 4 is a perspective view of the clip.

Similar numerals of reference designate corresponding parts in the several figures of the drawings.

Referring to the drawings, 1 designates a pair of clips mounted on the blades 2 of the steering-fork 3 at a suitable point intermediate the ends of said blades. These clips extend forward from the fork-blades and are connected thereto and to the inner ends of a pair of arms or rods 4. The joints between the said arms or rods and the clips on the fork-blades are of a universal nature, consisting each of two pivots extending substantially at right angles to each other, thus enabling the arms or forks 4 to be swung to any angle with relation to the steering-wheel.

At their outer ends the rods or arms 4 are recurved or provided with hook-shaped ends 5, and such ends are connected by means of a pair of resilient cross bars or links 6, each composed of flat strips of spring metal, such as steel. Each of said bars is pivotally connected at its opposite ends to the hooks 5 and is also composed of two sections which are connected at their adjacent ends. Each section is also provided at its inner end with a curved finger or clutch 7, arranged intermediate the pivotal connection of the sections, so that when the sections are swung into the proper position said fingers or clutches embrace the tire and rim of the bicycle upon opposite sides and prevent the subsequent turning of the wheel.

8 designates a brace which is pivotally connected at one end to one of the resilient bars 6 and connected pivotally at its opposite end to a sleeve slidingly mounted upon the opposing resilient bar 6. By sliding the sleeve (indicated) at 9 upon this bar 6 the brace 8 may be brought into a position substantially at right angles to the bars 6 or so as to extend across between the same and spread said bars apart for maintaining the clutches 7 at the proper positions apart and enabling them to obtain a grip upon the tire or rim, or both, at spaced points. Instead of connecting the brace 8 to a sliding sleeve its end may be left free, so that it may be swung in between the bars 6 and caused to engage with the bar opposite the bar to which it is pivotally connected. When not in use, the brace 8 may be folded parallel to the bar to which it is connected for enabling the device to be folded compactly against the head of the machine.

10 designates a clip which is secured to the handle-bar stem 11 of the machine. This clip comprises opposing U-shaped portions, one of which (indicated at 12) is hinged, as at 13, to facilitate the application of the clip to the handle-bar stem, the opposing portions of the clip being provided at their free ends with oppositely-disposed perforated ears 14 for the reception of a suitable clamping screw or bolt whereby the clip may be bound firmly to the stem. The clip is also provided with forwardly-extending ears 15, spaced a suitable distance apart, one being notched, as indicated at 16, while the other has pivotally connected thereto a spring-arm 17, which is adapted to be swung into engagement with the notch 16 for holding the bicycle-rest when the latter is folded into its inoperative position. The clip also comprises substantially parallel depending spring-clasps 18, having their lower ends looped, as indicated at 19, to form opposing jaws, between which the bars 6 of the rest may be engaged when the device is folded.

When the device is in its folded position, the bars 6 lie between the loops 19 and also between the ears 15 of the clip 10 and between the body of said clip and the spring-arm 17, which is placed in engagement with the notch 16 for preventing the accidental displacement of the rest. When it is desired to use the rest for supporting the machine in an upright position, the arm 17 is rocked to one side, so as to allow the rest to be folded downward and forward. The arms are then vibrated, so as to bring the clutches into engagement with the tire of the steering-wheel, said arms having first been spread apart by the brace 8. The steering-wheel is now turned so as to bring the bars 6 close to the ground or surface upon which the wheel is resting, whereupon the recurved or hooked ends 5 of the arms or rods 4 contact with the ground, the tendency being to spread said rods or bars farther apart, thereby causing the clutches to obtain a firmer hold upon the tire and rim, or both, one of the clutches engaging the wheel in advance of its lowest point, while the other clutch engages said rim in rear of such point. It will thus be seen that a firm support is provided for upholding the bicycle in an erect position, while at the same time the clutches engage the tire and rim so firmly as to prevent the rotation of said wheel.

The combined rest and lock may be manufactured at small cost and may be applied to any ordinary safety-bicycle in common use and when folded into its inoperative position is compact and unobtrusive.

Having thus described the invention, what is claimed as new, and desired to be secured by Letters Patent, is—

1. A combined rest and lock for bicycles, consisting of a pair of arms or rods adapted to be pivotally connected to the steering-fork, a pair of resilient bars pivotally connected to said free ends and made in pivoted sections and provided adjacent to their point of connection with fingers or clutches for gripping the steering-wheel at spaced points, and means for spreading said bars, substantially as described.

2. A combined rest and lock for bicycles, consisting of a pair of arms or rods adapted to be pivotally connected to the steering-fork, a pair of resilient bars connecting the ends of said arms or rods and each comprising pivoted sections having clutches adjacent to their point of pivotal connection, and a spreading-brace attached to one of said bars and adapted to engage the other bar for forcing the bars apart and enabling the clutches to engage the steering-wheel in front and rear of its lowermost point, substantially as described.

3. A combined rest and lock for bicycles, consisting of a pair of arms or rods adapted to be pivotally connected to the steering-fork by a universal joint, spring-bars pivotally connecting the ends of said arms or rods and made in pivoted sections each provided near its hinged end with a clutch-finger, and a spreading-brace pivotally connected to one of said bars and connected at its opposite end to a sleeve slidingly mounted on the opposing bar, substantially as described.

In testimony whereof I have signed this specification in the presence of two subscribing witnesses.

CHAS. MEE, Sr.

Witnesses:
JAMES COCHRANE,
C. H. JAMESON.